United States Patent [19]
Huggett et al.

[11] Patent Number: 5,568,034
[45] Date of Patent: Oct. 22, 1996

[54] FAULT-TOLERANT VARIABLE SPEED INDUCTION MOTOR DRIVE

[75] Inventors: Colin Huggett, Torrance; Gabor Kalman, Palos Verdes, both of Calif.

[73] Assignee: AlliedSignal Inc., Morris Township, N.J.

[21] Appl. No.: 411,134

[22] Filed: Mar. 27, 1995

[51] Int. Cl.⁶ .................................................. H02P 5/34
[52] U.S. Cl. ........................ 318/802; 318/806; 318/807
[58] Field of Search ................................ 318/801–803, 318/798–800

[56] References Cited

U.S. PATENT DOCUMENTS

| | | |
|---|---|---|
| 3,609,507 | 9/1971 | Beck . |
| 4,367,522 | 1/1983 | Forstbauer et al. . |
| 4,418,308 | 11/1983 | Bose ......................................... 318/803 |
| 4,453,116 | 6/1984 | Bose ......................................... 318/727 |
| 4,546,423 | 10/1985 | Seki . |
| 4,800,327 | 1/1989 | Fujioka et al. . |
| 4,999,561 | 3/1991 | Kaga et al. . |
| 5,006,778 | 4/1991 | Bashark ................................... 318/799 |

Primary Examiner—David S. Martin
Attorney, Agent, or Firm—John R. Rafter

[57] ABSTRACT

A drive arrangement for a fault tolerant variable speed induction motor provides a pair of current (torque and flux) command signals. The current command signals are converted to a three-phase output with sinusoidally varying signals. The three-phase output is modified to enable the motor to operate in the event one of the motor phases is open or disconnected. The modified three-phase output is used to provide first, second and third gate logic signals which are used for driving the motor.

15 Claims, 2 Drawing Sheets

FAULT-TOLERANT VARIABLE SPEED INDUCTION MOTOR DRIVE

BACKGROUND OF THE INVENTION

This invention relates generally to drive arrangements for variable speed three phase inverter fed induction motors and, more particularly, to a drive arrangement for motors of the type described which is fault tolerant.

Variable speed three phase inverter fed induction motor drive arrangements are extremely competitive in terms of cost and performance. However, in many aerospace applications, these arrangements have only limited usefulness since they are not fault tolerant. That is to say, a failure in one of the phases usually means the loss of the drive arrangement's starting capability.

In order to achieve fault tolerance, redundant motor windings and/or redundant inverter circuits are often required. Alternatively, in order to achieve the desired fault tolerance, three phase inverter fed induction motors have been replaced by switched reluctance machines. While the inverter topology of switched reluctance machines is indeed fault tolerant, the inherently high inductance of these machines makes them unsuitable for high performance servo applications as is often required for aerospace purposes.

The present invention uses the space vector concept and associated symmetrical component arrangements to render variable speed three phase inverter fed induction motor drive arrangements fault tolerant. Indeed, by utilizing the space vector concept, a motor of the type described can be operated (even started) with one of its three phases open and/or disconnected due to a fault.

It will be appreciated that a necessary condition for the drive arrangement contemplated by the present invention is that the current for each motor phase be controlled individually. This requirement implies that the motor neutral must be accessible and "grounded." If the motor neutral is not grounded, then, in the case of an inoperative motor phase, i.e. an open circuit, the currents in the remaining two phases are not independent.

The neutral of an induction motor supplied from a three phase inverter cannot be "grounded" to the center point of a DC link because in a normal, balanced three phase operation, the oscillating neutral phenomenon well known to those skilled in the art introduces large circulating currents through the motor and the inverter. If, however, a three phase induction motor with an accessible and "grounded" neutral is supplied from three independent single phase inverters, then the resulting drive arrangement can be made fault tolerant.

In a balanced three phase operation, the stator currents and the associated rotating field can be described in terms of their space vectors. If the neutral of the machine is ungrounded, the space vector fully defines the instantaneous phase quantities. If the neutral of the machine is "grounded," then in addition to the space vector, the zero sequence quantities of the stator current or flux must also be defined.

If current in one of the phases becomes zero due to a fault, the current regulators in the remaining two phases must operate according to a pre-defined control law to maintain a balanced rotating field, as will be understood by those skilled in the art.

To appreciate the space vector features of the present invention, it will first be understood that "vector diagrams" have long been used to graphically describe the performance of electrical machines. The term "vector diagram" has generally been replaced by the term "phasor diagram." As long as the voltages and currents represented in these diagrams are steady state sinusoidal quantities, there is little distinction between the terms. The primary feature of a phasor diagram is that it can display the steady-state phase difference between a voltage and its associated current.

When electrical quantities are non-sinusoidal and/or in a transient state, the phase relationship between a voltage and its associated current can vary from instant to instant and "phase shift" has no meaning at a given instant. The circumstances become even more complex in the case of three phase electrical machines, since the voltages and currents of the individual phase windings, in both the machine stator and rotor, can vary independently of each other. Thus, simple phasor diagrams are not sufficient to describe the aforementioned non-sinusoidal and/or transient phenomena. For this reason space vectors (also referred to as three-phase vectors or Park vectors) are introduced.

Space vectors described as aforenoted and as applied to a three phase electrical machine are described in the text "Transient Phenomena In Electrical machines" by P. K. Kovacs, published by Elsevier in 1984, the same being incorporated herein by reference. It should be noted that under steady-state conditions a space vector degenerates into a phasor.

The applicants herein are aware of the following prior art relating generally to the present invention: U.S. Pat. No. 4,367,522 which issued to Forstbauer, et al on Jan. 4, 1983 (U.S. Class 363,137); U.S. Pat. No. 4,800,327 which issued to Fujioka, et al on Jan. 24, 1989 (U.S. Class 318/798); and U.S. Pat. No. 4,999,561 which issued to Kaga, et al on Mar. 21, 1991 (U.S. Class 318/812).

The Forstbauer '522 patent discloses a three phase inverter arrangement wherein three pulse controlled, free running, single phase inverters are connected at their inputs to a DC voltage source. Each of the converters is controlled by an associated pulse control device containing a vector oriented control device and a control unit.

The Fujioka '327 patent discloses a three phase induction motor control method including the step of sensing voltage at a DC link section. The output of the motor is controlled so as to be constant in a conventional vector control type control circuit.

The Kaga '561 patent discloses a variable speed driving system for a three phase induction motor incorporating three phase inverters, a control mode judging circuit and a voltage difference detection circuit. The Kaga system equalizes the output powers of the series connected three phase inverters.

None of the aforementioned patents teach the particular structural arrangement herein disclosed as will be discerned from the description which follows.

It is to be further noted that in a recent publication entitled "Disturbance Free Operation Of A Multi-Phase Current Regulated Motor Drive With An Open Phase" by J. Fu and T. A. Lipo, published in the *IEEE Transactions on Industry Applications*, Volume 30, No. 5, September/October, 1994, pages 1267–1274, a fault tolerant arrangement is achieved with a three phase inverter and a WYE connected induction motor. However, for a three phase motor the Fu and Lipo arrangements need a center tapped DC link with an associated capacitor bank to which the neutral of the induction motor can be connected, and in this respect the Fu and Lipo arrangement is different than the arrangement herein disclosed.

SUMMARY OF THE INVENTION

This invention contemplates a drive arrangement for a fault tolerant variable speed induction motor wherein the motor responds to two current commands. One current command controls the torque and the other controls the flux (magnetizing current) of the induction motor. Accordingly, torque and current command signals are provided.

In operation, the motor receives the torque and current command signals. However, unlike a separately excited DC motor, the torque and flux in an induction motor are not independent of each other. Therefore, a decoupler is required to produce two orthogonal current commands which appear as DC signals at the output of the decoupler. These two commands are converted to a three phase output of sinusoidally varying signals. This use of orthogonal current commands and their conversion to a three phase signal is well known in the art.

A current controller generates inverter gate logic signals for driving an inverter so that for each individual phase of the three phase induction motor, the current error is minimized. Significantly, the current command signals are available even when one of the three phases of the induction motor is open. A fault tolerant module is used to provide a modified set of current command signals which enable the motor to operate efficiently even if one of its phases is open or disconnected.

DETAILED DESCRIPTION OF THE INVENTION

Figure 1:
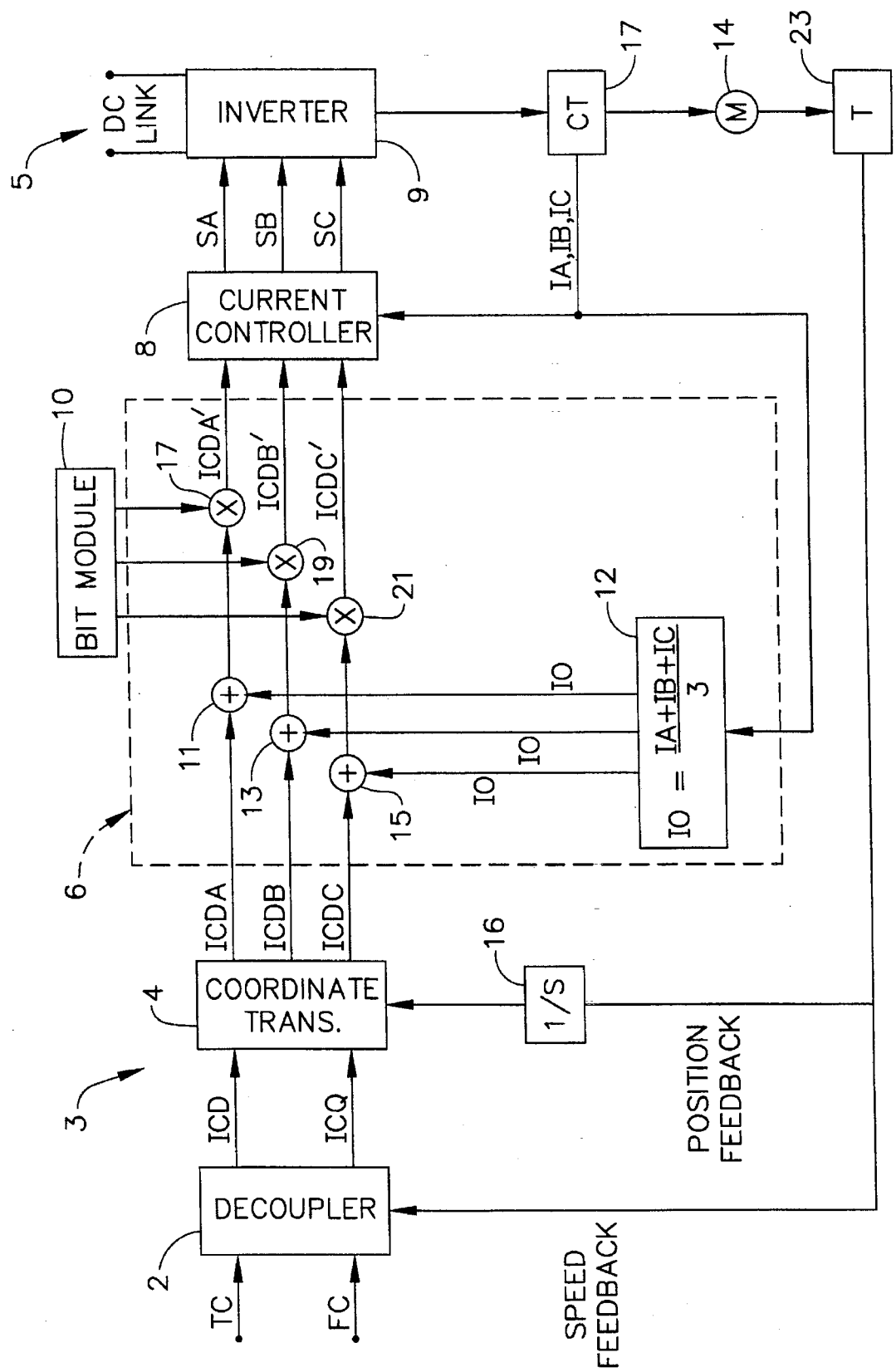
FIG. 1 is a block diagram illustrating an implementation of the present invention.

With reference to FIG. 1, the implementation of a fault tolerant arrangement in accordance with the present invention is described for purposes of illustration in conjunction with field oriented induction motor control. The fault tolerant arrangement includes a control section 3 and a power section 5. Power section 5 includes an inverter 9, a set (CT) 17 of three generic current sensors, a motor (M) 14 and a generic speed sensor (T) 23.

Field orientation will be recognized as a subset of the more general term of vector control. In this regard, reference is made to the following texts: *Vector Control Of AC Machines*, by P. Vas, Oxford Science Publications, 1990; and *The Field Orientation Principle In Control Of Induction Motors*, by A. Trzynadlowsky, published by Kluwer Academic Publishers, 1994.

The primary feature of a field oriented induction motor is that it has two current command signals designated as TC and FC wherein current command signal TC controls torque and current command signal FC controls flux, i.e. the magnetizing current of the induction motor, as aforenoted. It will be appreciated that an analogy can be made with DC motor armature current and field current commands, for separately excited DC motors. In a field oriented induction motor, the current command signals are orthogonal components of a current space vector.

Torque command signal TC and flux command signal FC are applied to a decoupler 2 in control section 3. Control section 3 also includes a coordinate transformer 4, a fault tolerant module 6 which is the essence of the invention, a current controller 8, and an IO device 12, all of which will be hereinafter described. A BIT module is designated by the numeral 10 and will also be hereinafter described.

Since in a separately excited DC motor, torque and flux in an induction motor are not independent of each other, therefore, the function of decoupler 2 is to provide two orthogonal current command signals ICD and ICQ which are the aforementioned orthogonal components of a current space vector and relate to torque and flux, respectively.

Signals ICD and ICQ appear at the output of decoupler 2 as DC signals and are then applied to a coordinate transformer 4. Coordinate transformer 4 transforms current command signals ICD and ICQ into a three phase output typically producing sinusoidally varying signals. The three-phase output signals are designated as ICDA (phase A), ICDB (phase B) and ICDC (phase C).

Fault tolerant module 6 receives signals ICDA, ICDB and ICDC and is connected to current controller 8.

For purposes of best describing the invention, the function of current controller 8 will be first described. Thus, current controller 8 generates inverter gate logic signals SA (phase A), SB (phase B) and SC (phase C) logic signals for driving inverter 9 in such a manner that in each individual phase of three phase induction motor 14, current error is minimized. In this regard, it should be noted that a field oriented induction motor is of the "current fed" type as opposed to a "voltage fed" induction motor. This use of orthogonal current commands and their conversion to a three phase signal is well known in the art.

The pertinent feature of a fault tolerant arrangement as herein disclosed is that converted current command signals ICDA, ICDB and ICDC are available even when one of the three phases of induction motor 14 is open. Thus, the function of fault tolerant controller 6 is to produce a modified set of current command signals, i e ICDA', ICDB' and ICDC'. THESE MODIFIED CURRENT COMMAND SIGNALS DEFINE A CURRENT SPACE VECTOR THAT REMAINS UNCHANGED IN THE CASE OF OPEN CIRCUITED OPERATION.

In an arrangement of the type described, there must be a capability to generate the zero sequence components (IO) of the three phase induction motor current, and there must also be the capability to detect which phase of the induction motor is open using information from BIT module 10. It will be appreciated that normal operation generates a logic "1" and open circuit operation generates a logic "0".

The generation of the zero sequence components (IO) of the three phase induction motor is illustrated in FIG. 1, wherein current command signals ICDA, ICDB and ICDC from coordinate transformer 4 are applied to adders 11, 13 and 15, respectively. CT set 17 in power section 5 is driven by inverter 9 and provides outputs IA, IB and IC, and which outputs are applied to IO device 12 and to current controller 8. CT set 17 measures the phase currents of motor 14. IO device 12 averages the applied signals to provide the zero sequence signals IO as indicated. Signals IO are added to signals ICDA, ICDB and ICDC by the respective adders 11, 13 and 15. The added signals are multiplied by appropriate logic "zero" or logic "one" signals from BIT module 10 via multipliers 17, 19 and 21 to provide modified signals ICDA', ICDB' and ICDC' respectively.

It will be appreciated that in FIG. 1 the arrangement of the invention is shown in terms of analog components. However, an equivalent digital version would also apply. The analog operations on the individual phase signals require only arithmetic addition and multiplication functions as indicated, whereby the outputs of fault tolerant module 6 become new command signals to current controller 8.

Motor speed sensor 23 (T) responds to the output of motor 14 and provides an output which is applied as motor speed feedback to decoupler 2, and which is applied through an integrator 16 as motor position feedback to coordinate transformer 4.

Figure 2:
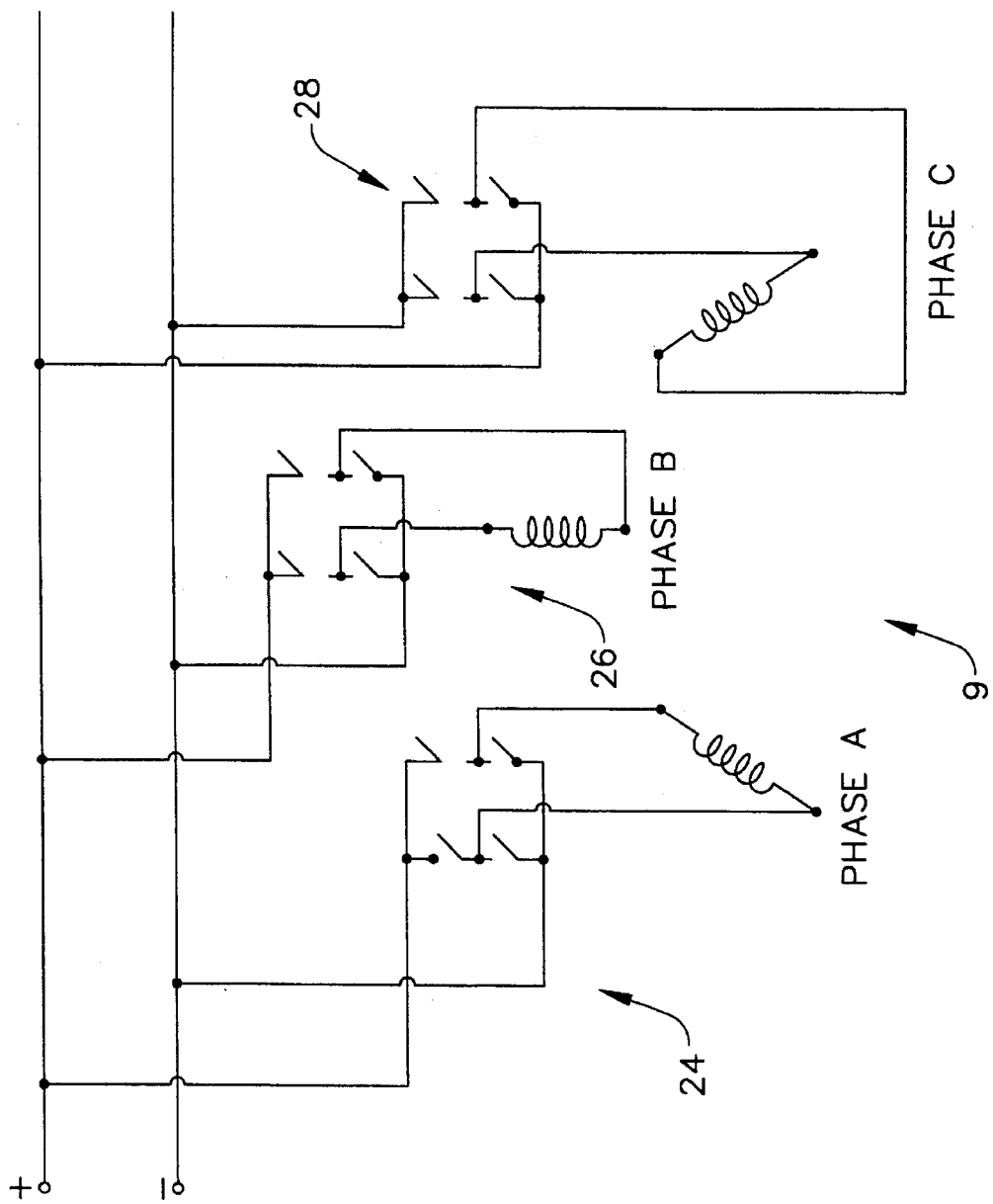
FIG. 2 is a circuit diagram illustrating an arrangement including three independent single phase inverters, as is required by the present invention.

It is to be noted that for a fault tolerant application, inverter 9 cannot be connected in a three phase full wave bridge configuration but must be connected in three separate single phase full wave bridge connections 24, 26 and 28, i.e. the so-called H bridge connection. This particular feature of the invention is illustrated in FIG. 2 wherein each of the phases A, B and C are shown so connected. This also implies that three phase induction motor 14 cannot be WYE-connected but rather all six leads must be brought out and each phase must be connected across its associated H bridge.

There has thus been described an arrangement using the space vector concept and associated symmetrical component arrangements to render variable speed induction motor drive arrangements fault tolerant. By utilizing the space vector concept, an inverter fed induction motor can operate and even start with one of its three phases open and/or disconnected due to a fault.

With the above description of the invention in mind, reference is made to the claims appended hereto for a definition of the scope of the invention.

What is claimed is:

1. A drive arrangement for a fault tolerant variable speed induction motor having three phase circuits, comprising:

means responsive to torque and flux current command signals for providing first and second current command signals;

means for converting the first and second current command signals to a three-phase output with sinusoidally varying signals;

means for modifying the three-phase output and for providing a modified three-phase output which enables the motor to operate even if one of the phase circuits is open;

means responsive to the modified three-phase output for providing first, second and third gate logic signals; and means responsive to the first, second and third gate logic signals driving the motor.

2. The arrangement as described by claim 1 wherein the means responsive to the first, second and third gate logic signals for driving the motor includes:

inverter means connected to the means for providing the first, second and third gate logic signals for providing an inverted output;

current sensor means connected to the inverter means and responsive to the inverter output for providing a motor driving output, and for providing three phase current outputs; and the motor connected to the current sensor means and driven by the inverter output therefrom.

3. The arrangement as described by claim 2, wherein:

the current sensor means is connected to the means for providing the first, second and third gate logic signals for applying the three phase current outputs to said means for providing said first, second and third gate logic signals.

4. The arrangement as described by claim 2, wherein the means for providing the modified three phase output includes:

means connected to said means for providing the three phase current outputs for averaging said outputs and for providing three zero sequence components of the three phase current outputs;

means for adding said three zero sequence components with respective signals of the sinusoidally varying signals and for providing three added signals;

BIT module means for providing three BIT outputs, each of which corresponds to one of the three phases; and means for multiplying each of the three outputs from the module with a respective added signal for providing the modified three phase output.

5. The arrangement as described by claim 3, wherein the means for providing the modified three-phase output includes:

means connected to said means for providing the three phase current outputs for averaging said outputs and for providing three zero sequence components of the three phase current outputs;

means for adding said three zero sequence components with respective signals of the sinusoidally varying signals and for providing three added signals;

BIT module means for providing three BIT outputs, each of which corresponds to one of the three phases; and means for multiplying each of the three outputs from the bit module with a respective added signal for providing the modified three phase output.

6. The arrangement as described by claim 1, including:

speed sensor means connected to the motor and connected to the means for providing first and second current command signals for applying a motor speed feedback signal to said means for providing said first and second current command signals, and connected to the means for providing the three-phase output for applying the motor speed signal through an integrator as a position feedback signal to said three-phase output means.

7. The arrangement as described by claim 2, wherein:

the inverter means is connected in three separate single phase full wave bridge connections, and each motor phase is connected across its associated bridge.

8. A method for providing a drive arrangement for a fault tolerant variable speed induction motor having three phase circuits, comprising:

responding to torque and flux current command signals for providing first and second current command signals;

converting the first and second current command signals to a three-phase output with sinusoidally varying signals;

modifying the three-phase output to enable the motor to operate even if one of the phase circuits is open;

responding to the modified three-phase output for providing first, second and third gate logic signals; and driving to motor in response to the first, second and third gate logic signals.

9. The method as described by claim 8, wherein driving the motor in response to the first, second and third gate logic signals includes:

inverting the first, second and third gate logic signals for providing an inverted output;

sensing the inverted output for providing a motor driving output and for providing three phase current outputs; and the motor driving output driving the motor.

10. The method as described by claim 9, including:

responding to the modified three-phase output and the three phase current outputs for providing the first, second and third gate logic signals.

11. The method as described by claim 9, including:

averaging the three phase current outputs for providing three zero sequence components of the three phase current outputs;

adding the three zero sequence components with respective signals of the sinusoidally varying signals for providing three added signals;

providing BIT outputs, each of which corresponds to one of the three phases; and multiplying each of the BIT outputs with a respective added signal for providing the modified three-phase output.

12. The method as described by 10, including:

averaging the three phase current outputs for providing three zero sequence components of the three phase current outputs;

adding the three zero sequence components with respective signals of the sinusoidally varying signals for providing three added signals;

providing BIT outputs, each of which corresponds to one of the three phases; and multiplying each of the outputs from the three bit modules with a respective added signal for providing the modified three-phase output.

13. The method as described by claim 8, including:

sensing motor speed;

applying said sensed motor speed as motor speed feedback, whereby said first and second current command signals are commensurate with said motor speed feedback; and integrating the sensed motor speed and applying the integrated sensed motor speed as position feedback, whereby said three-phase output with sinusoidally varying signals is commensurate with said position feedback.

14. A drive arrangement for a fault tolerant variable speed induction motor having three phase circuits, comprising:

means responsive to torque and flux current command signals for providing first and second current command signals;

means for converting the first and second current command signals to a three-phase output with sinusoidally varying signals;

means for modifying the three-phase output to provide a modified three-phase output which comprises an average of said three phase output and three zero sequence components that enable the motor to operate even if one of the phase circuits is open;

means responsive to the modified three-phase output for providing first, second and third gate logic signals; and means responsive to the first, second and third gate logic signals driving the motor.

15. The drive arrangement for a fault tolerant variable speed induction motor of claims 14 wherein the means for modifying the three phase output includes an adder coupled to an IO device for averaging said three phase output signals to thereby provide a modified three phase signal have three zero sequences.

* * * * *